(12) United States Patent
Rashed et al.

(10) Patent No.: US 7,799,375 B2
(45) Date of Patent: Sep. 21, 2010

(54) PROCESS FOR THE MANUFACTURING OF DENSE SILICON CARBIDE

(75) Inventors: Abuagela H. Rashed, Denton, TX (US); Rex G. Sheppard, Decatur, TX (US); Donald J. Bray, Irving, TX (US)

(73) Assignee: Poco Graphite, Inc., Decatur, TX (US)

( * ) Notice: Subject to any disclaimer, the term of this patent is extended or adjusted under 35 U.S.C. 154(b) by 608 days.

(21) Appl. No.: 11/170,199

(22) Filed: Jun. 29, 2005

(65) Prior Publication Data

US 2006/0003098 A1    Jan. 5, 2006

Related U.S. Application Data

(60) Provisional application No. 60/584,244, filed on Jun. 30, 2004.

(51) Int. Cl.
*C23C 16/32* (2006.01)
(52) U.S. Cl. .................................. 427/249.2
(58) Field of Classification Search ................. 427/228, 427/249.2
See application file for complete search history.

(56) References Cited

U.S. PATENT DOCUMENTS

| | | | | |
|---|---|---|---|---|
| 3,205,043 | A * | 9/1965 | Taylor | 423/345 |
| 5,981,002 | A * | 11/1999 | Connors, Jr. | 427/591 |
| 6,221,475 | B1 * | 4/2001 | Domergue et al. | 428/292.1 |
| 6,743,393 | B1 * | 6/2004 | Petrak | 264/625 |
| 2001/0003620 | A1 * | 6/2001 | Dubots et al. | 428/446 |
| 2002/0151428 | A1 * | 10/2002 | Horiuchi et al. | 501/88 |
| 2003/0118728 | A1 * | 6/2003 | Sion et al. | 427/249.2 |

OTHER PUBLICATIONS

Wang et al, The effect of porous carbon preform and the infiltration process on the properties of reaction-formed SiC, Carbon 42 (2004), p. 1833-1839.*
Berbon et al, Effect of 1600C heat treatment on C/SiC composites fabricated by polymer infiltration and pyrolysis with allylhydridopolycarbosilane, J. Am. Ceram. Soc. 85 [7], p. 1891-1893, 2002.*
Interrante et al, Silicon-based ceramics from polymer precursors, Pure Appl. Chem, vol. 74, No. 11, pp. 2111-2117, 2002.*
SUPERSiC Silicon Carbide Material System, www.poco.com.*
Hozer et al, Reaction-infiltrated, net-shape SiC composites, Materials Science and Engineering A195 (1995), p. 131-143.*
Wang et al, Preparation of porous carbon derived from mixtures of furfuryl resin and glycol with controlled pore size distribution, Carbon 41, Available online Jul. 31, 2003, p. 2065-2072.*
Interrante et al, Fabrication of SiC matrix composites by liquid phase infiltration with a polymeric precursor, Material Research Society Symposium Proceedings, vol. 365, 1995, Abstract.*
Wang Y et al: "The fabrication of reaction-formed silicon carbide with controlled microstructure by infiltrating a pure carbon preform with molten Si" Ceramics International, Elsevier, Amsterdam, NL vol. 30, No. 3, 2004, pp. 435-439, XP00 4494749 Shanghai, China.
Wang Y et al: "The effect of porous carbon preform and infiltration process on the properties of reaction-formed SiC" Carbon, vol. 42, No. 8-9, 2004, pp. 1833-1839, XP004509643 Shanghai, China.

* cited by examiner

*Primary Examiner*—Timothy H Meeks
*Assistant Examiner*—Elizabeth Burkhart
(74) *Attorney, Agent, or Firm*—Patterson Thuente Christensen Pedersen, P.A.

(57) ABSTRACT

A method of producing a densified SiC article is provided. Near-net shape porous silicon carbide articles are produced and densified using the developed method. A substantial number of pores within the porous near-net shape silicon carbide article are filled (impregnated) with a carbon precursor, a silicon carbide precursor, or a mixture of both. The carbon precursor can be liquid or gas. The filled SiC preform is heated to convert the carbon or silicon carbide precursor to porous carbon or SiC preform inside the pores of the net-shape silicon carbide article. The impregnation/pyrolysis cycle is repeated until the desired amount of carbon and/or silicon carbide is achieved. In case of a carbon or a mixture of silicon carbide/carbon precursor is used, the pyrolyzed near-net shape silicon carbide article is then contacted with silicon in an inert atmosphere. The silicon diffuses through the pyrolyzed near-net shape silicon carbide article and reacts with the carbon contained within the pores of the porous SiC preform producing a new phase of silicon carbide within the pores of the near-net shape silicon carbide article. The produced silicon carbide is a near-net dense silicon carbide article.

20 Claims, No Drawings

PROCESS FOR THE MANUFACTURING OF DENSE SILICON CARBIDE

RELATED APPLICATIONS

This patent application claims priority to U.S. Provisional Patent Application Ser. No. 60/584,244 filed on Jun. 30, 2004, which is incorporated by reference in its entirety.

BACKGROUND OF THE INVENTION

1. Technical Field of the Invention

The present invention relates to a method of producing silicon carbide articles.

2. Description of the Related Art

Silicon carbide (SiC) or moissanite is a ceramic compound consisting of carbon and silicon. SiC was accidentally discovered by Edward G. Acheson, an assistant to Thomas Edison, about 1890, when he was running an experiment on the synthesis of diamonds. Acheson thought the new material was a compound of carbon and alumina, present in the clay, leading him to name it carborundum, a name that is still being used on some occasions. SiC occurs naturally in meteorites, though very rarely and in very small amounts. Being the discoverer of SiC, Acheson was the first to synthesize SiC by passing an electric current through a mixture of clay and carbon. Today, SiC is still produced via a solid state reaction between sand (silicon dioxide) and petroleum coke (carbon) at very high temperatures in electric arc furnaces.

Several processes exist for making the SiC material. The most basic and simple process is combining sand and carbon in a temperature of about 1600 to 2500° C. Other processes for the synthesis of SiC include chemical vapor deposition and pyrolysis of organic SiC precursors such as polycarbosilane polymers. Conventional processes for the fabrication of near-net shape dense SiC components such as pressureless sintering and hot pressing, and the like are difficult to operate and control and are cost-prohibitive.

Conventional ceramic processes, such as pressureless sintering, for the manufacturing of near-net shape SiC articles are becoming costly due to the increased complexity of some of these SiC components. To produce a SiC article, the starting SiC powder is processed in the form of dry powder or a slurry followed by shaping, firing and final machining. The shaping or molding process requires the mold or die to be designed to accommodate for the shrinkage that takes place during the high temperature firing. The shrinkage of the SiC article is crucial to achieve the required densification or sintering. Accordingly, for every SiC article to be designed and manufactured, a special mold needs to be designed and made. Mold designs require the knowledge of shrinkage behavior of the material, which is a function of the SiC particle size distribution, chemistry and rheology of the slurry, firing temperature, heating and cooling rates, etc. The effects of these parameters need to be determined experimentally until enough information is available for a suitable mold to produce a specific near-net shape SiC article. Furthermore, the mold has a limited lifetime due to erosion resulting from each use that would cause dimensional changes of the mold, which in turn result in unpredictable dimensions of the sintered SiC product. In addition, producing a slurry with high solids loading and controlled chemistry and rheology requires the use of a bimodal SiC powder, where coarse particulates are mixed with fine powder. The use of coarse SiC particulates presents many problems such as poor thermal shock resistance of the material and poor isotropy. Recent technical advances indicate that monolithic and composite materials with fine microstructure possess superior and more uniform properties.

Prior art processes for manufacturing dense SiC articles are difficult to operate and are expensive. A need exists for a process that is capable of producing SiC articles that have reduced porosity to improve the chemical, mechanical, and thermal properties associated with SiC articles. It would be advantageous for the process to be simple to operate and be cost effective.

Recent studies have led to the development of a new SiC manufacturing process for the fabrication of near net shape SiC articles starting with near net shape graphite articles. The new process is known as the chemical vapor reaction (CVR) process. The CVR process has the capability of producing very complex shapes of SiC articles at a much lower cost than the conventional processes described above. However, SiC articles produced by the CVR process contain some porosity that could be detrimental to the chemical, mechanical and thermal properties of the SiC product. It would be advantageous to overcome this residual porosity. It would be advantageous to convert such porosity into a second phase of SiC.

SUMMARY OF THE INVENTION

In view of the foregoing, the present invention advantageously provides a process for the manufacturing of dense, near-net shaped silicon carbide (SiC) articles having essentially no or substantially reduced porosity. The process described herein densifies the porous, near-net shape SiC preform by converting the open porosity in the near-net shape SiC preform to a second phase of dense SiC.

As an embodiment of the present invention, a method of producing a densified SiC (silicon carbide) article is advantageously provided. In this embodiment, a porous SiC preform is provided. A preform is an article that can be formed to finish form. In all embodiments of the present invention, the porous SiC preform can be formed starting with a graphite block that has an open porosity. The graphite block can be machined into a near-net shape graphite article. The term near-net shape is used here to indicate that the part will require only minimal post machining to meet final tolerances. The term preform encompasses near-net shape articles. The graphite preform can then be contacted with silicon monoxide gas at a first preselected temperature to form the porous silicon carbide preform. A substantial number of pores within the porous silicon carbide preform are then filled with a carbon precursor to produce a filled silicon carbide preform. The filled silicon carbide preform is then heated at a second preselected temperature to polymerize the carbon precursor contained within the filled silicon carbide preform to form a polymerized filled silicon carbide preform. The polymerized filled silicon carbide preform is further heated at a third preselected temperature to produce a carbonaceous porous structure within the pores of the porous silicon carbide preform. The carbonaceous porous structure, inside the SiC preform, is then contacted with silicon in an inert atmosphere at a fourth preselected temperature and a first preselected pressure. In this step, the silicon wicks through the carbonaceous porous structure and reacts with carbon contained within the pores of the porous silicon carbide preform to produce silicon carbide within the pores of the porous silicon carbide preform. The produced densified silicon carbide is characterized by having no or substantially reduced open porosity. The elimination or substantial reduction in porosity will significantly improve most chemical, mechanical and thermal properties including but not limited to oxidation resistance, strength, stiffness, thermal conductivity, and thermal stability of SiC articles produced using the process described in this invention.

Variations to the processes described herein are possible. For example, in embodiments of the present invention, the carbon precursor can be a liquid or a gas. Exemplary liquid carbon precursors can include a furfuryl alcohol, a liquid SiC—C precursor, or a phenolic resin. If a liquid carbon precursor is used, then the liquid carbon precursor can also include a catalyst and optionally a pore-forming agent. The catalyst can be a latent catalyst, an active catalyst, or a combination of both. In the step of contacting the carbonaceous porous structure with silicon, the silicon can be a liquid or a gas. Other variations are possible as will be understood by those of ordinary skill in the art.

DETAILED DESCRIPTION OF THE INVENTION

As an embodiment of the present invention, a method of producing a densified SiC article is advantageously provided. The resulting dense SiC article is created by converting the open porosity in the preform, or near-net shape, SiC article to a second phase of dense SiC. The porous SiC article, used as a preform, is produced using any of the different conventional processes for the manufacturing of porous ceramic bodies. Preferably, the preform SiC article is produced using the chemical vapor reaction (CVR) process, as understood by those of ordinary skill in the art. The SiC preform preferably can contain an open porosity ranging from 10% to 60% by volume. In this process, the open pores are converted to a second phase of SiC.

In all embodiments that a porous silicon carbide preform is provided, the porous silicon carbide structure can be produced by supplying a graphite block that has an open porosity. The graphite block is then machined into a near-net shape article and then contacted with silicon monoxide gas at a first preselected temperature to form the porous silicon carbide preform. In all embodiments of the present invention, the first preselected temperature is in a range of about 1400° C. to about 2000° C. The porous silicon carbide preform or SiC preform can be produced by other methods as described herein.

A substantial number of pores within the porous silicon carbide preform are then filled with a carbon precursor to produce a filled silicon carbide preform. When the carbon precursor is a gas, the filled carbide preform has its pores at least partially filled with the gas. In this carbonization step, the carbon precursor impregnates or infiltrates the porous silicon carbide preform to produce a carbon structure within the open pores of the porous silicon carbide preform. When the carbon precursor is liquid, the filled silicon carbide preform is then heated at a second preselected temperature to polymerize the carbon precursor contained within the filled silicon carbide preform to form a polymerized filled silicon carbide preform. In embodiments of the present invention using a liquid precursor, the second preselected temperature is in a range of about 70° C. to about 250° C. Another preferred embodiment includes the second preselected temperature being in a range of about 90° C. to about 150° C.

The polymerized filled silicon carbide structure is further heated at a third preselected temperature to produce a carbonaceous porous structure within the pores of the porous silicon carbide preform. The carbonaceous porous structure is essentially charred. In all embodiments of the present invention, the third preselected temperature is in a range of about 800° C. to about 1800° C. In a preferred embodiment, the third preselected temperature is in a range of about 800° C. to about 1200° C. The process can be repeated until the desired amount of carbon is produced within the pores of the porous SiC preform.

The carbonaceous porous structure is then contacted with silicon in an inert atmosphere at a fourth preselected temperature and a first preselected pressure. In embodiments of the present invention contacting the carbonaceous porous structure with silicon in an inert atmosphere, the fourth preselected temperature is about above a melting point of silicon. In this siliconization step, the silicon infiltrates or diffuses through the carbonaceous porous structure and reacts with carbon contained within the pores of the porous silicon carbide preform to produce silicon carbide within the pores of the porous silicon carbide preform. The produced silicon carbide is a near-net shape dense silicon carbide article. The conversion of carbon to SiC is accompanied with an increase in the molar volume which results in densification. The produced dense silicon carbide has essentially no or substantially reduced open porosity.

Variations to all embodiments of the processes described herein are possible. For example, in embodiments of the present invention, the carbon precursor can be a liquid or a gas. Exemplary liquid carbon precursors can include a furfuryl alcohol, a liquid SiC—C precursor, or a phenolic resin. If a liquid carbon precursor is used, then the liquid carbon precursor can also include a catalyst and optionally a pore-forming agent. Example pore-forming agents can include diethylene glycol, polyethylene glycol, triethylene glycol, water, and combinations thereof. The catalyst can be a latent catalyst, an active catalyst, or a combination of both. In the step of contacting the carbonaceous porous structure with silicon, the silicon can be a liquid or a gas. Other variations are possible as will be understood by those of ordinary skill in the art.

When a pore-forming agent is used, it evaporates during the carbonization step leaving behind a carbonaceous structure with interconnected open porosity. The selection of the pore-forming agent can allow for control of pore size distribution in the produced carbonaceous structure inside the pores of the SiC preform. If a liquid SiC—C precursor is used, a porous structure composed of a mixture of SiC and carbon will form during the carbonization step of the process when the filled SiC preform is heated at a second preselected temperature. If a gaseous carbon precursor is used, then the heating step at the second pre-selected temperature can be excluded. The preferred gaseous carbon precursor dissociates at the third pre-selected temperature to deposit pyrolytic carbon/graphite inside the pores of the SiC article. Exemplary gaseous carbon precursors include most hydro-carbons such as methane and the like. Alternatively, a liquid silicon carbide precursor can be used for the densification process. Exemplary SiC precursors include the liquid allylhydridopolycarbosilane (AHPCS) and the like. When using a liquid silicon carbide precursor, the final silicon infiltration step is optional, since there is no carbon that needs to be converted to SiC.

As another embodiment of the present invention, a method of producing a densified SiC article is advantageously provided. In this embodiment, a porous silicon carbide preform having an open porosity is provided. The open porosity is preferably in a range of about 10% to about 60%. The porous silicon carbide preform can be formed or produced by supplying a graphite block having an open porosity, machining the graphite block into near-net shape graphite articles, and contacting the near-net shape graphite article with silicon monoxide at a first preselected temperature to form a porous near-net shape silicon carbide preform or porous silicon carbide preform.

Other conventional manufacturing processes, such as SiC powder processing methods, can be used to form the porous silicon carbide preform. Preferably, however, the porous SiC preform is produced using the CVR process. In an example using the CVR process, the near-net shape porous SiC article is produced by supplying and machining a graphite block with known open porosity to produce a near-net shape graphite article. Several graphite grades are available with varying particle and pore size distribution characteristics. The near-net shape graphite article is exposed to silicon monoxide (SiO) gas at high temperatures. The SiO gas diffuses throughout the graphite article and reacts with the graphite producing the porous SiC preform with minimal, predictable and constant dimensional increases. Other suitable processes for manufacturing the porous SiC preform will be known to those of skill in the art and are to be considered within the scope of the present invention.

A substantial number of pores within the porous silicon carbide preform are then filled with a liquid carbon precursor to produce a filled silicon carbide preform. The liquid carbon precursor further comprises a catalyst selected from the group consisting of a latent catalyst, an active catalyst, and combinations thereof. The filled silicon carbide preform is then heated at a second preselected temperature to polymerize the liquid carbon precursor contained within the filled silicon carbide preform to form a polymerized filled silicon carbide preform. The polymerized filled silicon carbide preform is then heated at a third preselected temperature to produce a carbonaceous porous structure within the pores of the porous silicon carbide preform. The carbonaceous porous structure is then contacted with silicon in an inert atmosphere at a fourth preselected temperature and a first preselected pressure. The silicon diffuses through the carbonaceous porous structure and reacts with carbon contained within the pores of the porous silicon carbide preform to produce silicon carbide within the pores of the porous silicon carbide preform.

As yet another embodiment of the present invention, the present invention advantageously includes a method of producing a densified SiC article having a near-net shape. In this embodiment, a porous silicon carbide perform having an open porosity is provided. The open porosity is preferably in a range of about 10% to about 60% porosity. The porous silicon carbide preform can be formed from a graphite block or other suitable manufacturing processes as described herein. The preferred manufacturing method of producing the porous silicon carbide preform is utilizing the CVR process, as understood by those of ordinary skill in the art.

A substantial number of pores within the porous silicon carbide preform are filled with a gaseous carbon precursor that is allowed to diffuse throughout the porous silicon carbide preform and heated to a third pre-selected temperature to decompose the gaseous carbon precursor and deposit pyrolytic carbon/graphite within a substantial number of the pores of the porous silicon carbide preform to produce a filled silicon carbide preform. The filled silicon carbide preform is then contacted with silicon in an inert atmosphere at a temperature above the melting point of silicon and at a first preselected pressure. During this step, the silicon diffuses through the carbonaceous porous structure and reacts with the pyrolytic carbon/graphite contained within the pores of the porous silicon carbide preform to produce silicon carbide within the pores of the porous silicon carbide preform. The resulting dense silicon carbide has essentially no or substantially reduced porosity.

EXAMPLE 1

A block of porous graphite was produced by Poco Graphite having an average porosity of about 30%. The porous graphite block was machined into 0.25"×2"×2" tiles and 0.25"×0.5"×4" bars. The porous graphite tiles and bars were then heated at 1800° C. in the presence of silicon monoxide gas to convert the porous graphite tiles and bars to porous silicon carbide tiles and bars. The porous silicon carbide tiles and bars were then impregnated with a liquid mixture of allylhydridopolycarbosilane (AHPCS) and phenolic resin which upon pyrolysis would produce a solid mixture of silicon carbide and carbon. The impregnated silicon carbide tiles and bars were then heated to a pre-selected second temperature of 150° C. in air to polymerize the silicon carbide/carbon precursor. The tiles and bars were then heated further in an inert atmosphere to 1600° C. to char the polymer and to produce a mixture of silicon carbide and carbon structure inside the pores of the silicon carbide tiles and bars. This impregnation/polymerization/char cycle was repeated five more times to produce more silicon carbide and carbon inside the pores of the silicon carbide tiles and bars. The carbonized tiles and bars were then infiltrated with liquid silicon at 1650° C. in an inert atmosphere. The liquid silicon filled the residual porosity of the tiles and bars and reacted with the carbon producing a new phase of silicon carbide. Characterization of the densified silicon carbide samples according to this example resulted in the improved properties shown by Table 1.

EXAMPLE 2

A block of porous graphite was produced by Poco Graphite having an average porosity of about 30%. The porous graphite block was machined into 0.25"×2"×2" and 0.25"×4"×4" porous graphite tiles. The graphite tiles were then heated at 1800° C. in the presence of silicon monoxide gas to convert the graphite tiles to silicon carbide tiles. The porous silicon carbide tiles were then impregnated with a liquid mixture of catalyzed furfuryl alcohol as the carbon precursor and a mixture of diethylene glycol and triethylene glycol as the pore-forming agent. The impregnated silicon carbide tiles were then heated to 90° C. in air to polymerize the furfuryl alcohol. The samples were then further heated in an inert atmosphere to 1000° C. to evaporate the pore-forming agent and char the polymer to produce a carbon structure with interconnected porosity inside the pores of the silicon carbide tiles. This carbonization cycle was repeated one more time to produce more carbon inside the pores of the silicon carbide tiles. The carbonized tiles were then infiltrated with liquid silicon at 1650° C. in an inert atmosphere. The liquid silicon filled the residual porosity of the tiles and reacted with the carbon producing a new phase of silicon carbide. The dense silicon carbide tiles were then machined into test specimens for measuring their physical, thermal and mechanical properties. Table 1 shows the results.

EXAMPLE 3

A block of porous graphite was produced by Poco Graphite having an average porosity of about 30%. The porous graphite block was machined into 0.25"×2"×2" tiles and 0.25"×0.5"×4" bars. The graphite tiles and bars were then heated at 1800° C. in the presence of silicon monoxide gas to convert the graphite tiles and bars to silicon carbide tiles and bars. The porous silicon carbide tiles and bars were then heated to about 1000° C. in the presence of methane ($CH_4$) gas as the carbon precursor. The methane gas diffused into the pores and decomposed into solid pyrolytic carbon/graphite and hydrogen gas. The solid carbon/graphite deposited inside the pores of the silicon carbide tiles and bars while the hydrogen gas diffused out of the porous silicon carbide tiles and bars. This process was allowed to continue until the samples gained about 4-5% weight. The carbonized tiles and bars were then infiltrated with liquid silicon at 1650° C. in inert atmosphere to convert the pyrolytic carbon/graphite to silicon carbide.

EXAMPLE 4

A block of porous graphite was produced by Poco Graphite having an average porosity of about 30%. The porous graphite block was machined into 0.25"×2"×2" tiles and 0.25"×0.5"×4" bars. The porous graphite tiles and bars were then heated at 1800° C. in the presence of silicon monoxide gas to convert the porous graphite tiles and bars to porous silicon carbide tiles and bars. The porous silicon carbide tiles and bars were then impregnated with the commercially available liquid AHPCS as the silicon carbide precursor. The impregnated silicon carbide tiles and bars were then heated to about 150° C. in air to polymerize the silicon carbide precursor. The tiles and bars were then heated further in an inert atmosphere to 1600° C. to pyrolyze the polymer and convert it to SiC preform inside the pores of the silicon carbide tiles and bars. This impregnation/polymerization/pyrolysis cycle was repeated five more times to produce more silicon carbide inside the pores of the silicon carbide tiles and bars. No silicon infiltration was necessary in this example. Characterization of the densified silicon carbide samples according to this example resulted in improved properties as shown by Table 1.

TABLE 1

Some Properties of the Densified Silicon Carbide as Compared to the Porous Silicon Carbide Preform.

| Property | SiC Preform | Example 1 | Example 2 | Example 4 |
|---|---|---|---|---|
| Density (g/cm$^3$) | 2.53 | 3.08 | 3.05 | 2.71 |
| Open Porosity (%) | 18–19 | 0.3 | 0.2 | 2.3 |
| Total Impurity (ppm) | 5 | 14 | 6 | 30 |
| Flexural Strength (ksi) | 21.3 | 27.1 | 39.0 | 29.7 |
| Young's Modulus (msi) | 33 | 58 | 55 | 35 |
| Fracture Toughness, $K_{IC}$ (MPa·m$^{1/2}$) | 2.25 | N/A | 2.84 | N/A |
| Thermal Conductivity (W/m·K) | 157 | N/A | 218 | 165 |

As an advantage of the present invention, the SiC articles made in accordance with an embodiment of the present invention have improved chemical, mechanical, and thermal properties, such as improved resistance to oxidation, increased strength, improved stiffness, improved thermal conductivity, and improved thermal stability. As another advantage of the present invention, neither the carbonization step nor the siliconization step results in significant overall dimensional change in the porous silicon carbide preform. Because the overall size of the article is not changed significantly, the required post machining is minimum to produce the final net shape dense SiC articles which reduces the manufacturing cost as compared to other conventional prior art processes for the production of dense SiC article.

While the invention has been shown or described in only some of its forms, it should be apparent to those skilled in the art that it is not so limited, but is susceptible to various changes without departing from the scope of the invention. For example, various means of contacting the porous silicon carbide preform with the carbon precursor can be used or various methods of producing the carbon preform can be used. In addition, other types of pore-forming agents can be used when a liquid carbon precursor is used.

We claim:

1. A method of producing a densified SiC article, the method comprising the steps of:
   a) supplying a porous preform formed entirely from a first phase of silicon carbide and having a known open porosity, wherein the porous silicon carbide preform is formed from a near-net shape graphite article;
   b) filling a substantial number of pores within the porous silicon carbide preform with a carbon precursor to produce a filled silicon carbide preform;
   c) heating the filled silicon carbide preform at a preselected carbonization temperature in a range from about 800° C. to about 1800° C. to produce a carbonaceous porous structure within the pores of the porous silicon carbide preform;
   d) comparing a carbonization weight of the carbonaceous porous structure to an initial weight of the porous silicon carbide preform to verify an expected weight gain of the carbonaceous porous structure based upon the known porosity of the porous silicon carbide preform;
   e) repeating steps (b) through (d) as necessary until the expected weight gain of the carbonaceous porous structure is provided within the pores of the porous silicon carbide preform; and
   f) contacting the carbonaceous porous structure with a silicon precursor at a temperature of 1650° C. so that the silicon precursor diffuses through the carbonaceous porous structure and reacts with carbon contained within the pores of the porous silicon carbide preform to produce a second phase of silicon carbide within the pores of the porous silicon carbide preform, such that the resulting densified silicon carbide article is densified with silicon carbide and exhibits lower porosity compared to the porous silicon carbide preform and is a SiC—SiC composite.

2. The process of claim 1, wherein the carbon precursor comprises a hydrocarbon gas.

3. The process of claim 2, wherein the hydrocarbon gas comprises methane.

4. The process of claim 3, wherein the known porosity of the porous silicon carbide preform is about 30%, and the methane gas is allowed to diffuse into the pores of the porous silicon carbide preform until the carbonaceous porous structure achieves a weight gain of about 4-5% compared to the initial weight of the silicon carbonide preform.

5. The process of claim 1, wherein the carbon precursor comprises a liquid carbon precursor.

6. The process of claim 5, further comprising heating the silicon carbide preform filled with a liquid carbon precursor at a preselected polymerization temperature prior to step (c) to polymerize the carbon precursor and form a polymerized filled silicon carbide preform.

7. The process of claim 6, wherein the preselected polymerization temperature is in a range of about 70° C. to about 250° C.

8. The process of claim 6, wherein the expected weight gain of the carbonaceous porous structure is about 4-5% of the initial weight of the silicon carbide preform.

9. The process of claim 5, wherein the liquid carbon precursor is selected from the group consisting, of furfuryl alcohol, allylhydridopolycarbosilane, phenolic resin and combinations thereof.

10. The process of claim 5, wherein the liquid carbon precursor further comprises a catalyst selected from the group consisting of a latent catalyst, an active catalyst, and combinations thereof.

11. The process of claim 5, wherein the liquid carbon precursor further comprises a pore-forming agent selected from the group consisting of diethylene glycol, polyethylene glycol, triethylene glycol, water, and combinations thereof and a catalyst selected from the group consisting of a latent catalyst, an active catalyst, and combinations thereof.

12. The process of claim 1, wherein the carbon precursor and the silicon precursor comprises a liquid silicon carbide precursor, such that steps (b) and (f) are performed simultaneously to produce the second phase of silicon carbide within the pores of the porous silicon carbide preform when the liquid silicon carbide precursor within the pores of the silicon carbide preform is subsequently heated.

13. The process of claim 12, wherein step (c) is performed subsequent to producing the second phase of silicon carbide within the pores of the porous silicon carbide preform to pyrolyze the polymer into silicon carbonide within the pores of the porous silicon carbide preform, and the steps of producing the second phase of silicon carbide from the liquid silicon carbide precursor and subsequent heating step to pyrolyze the polymer are repeated until a desired amount of silicon carbide is provided within the pores of the porous silicon carbide preform such that the density of the SiC—SiC composite is greater than 2.71 g/cm$^3$.

14. The process of claim 12, wherein the liquid silicon carbide precursor is allylhydridopolycarbosilane.

15. The process of claim 1, further comprising the step of contacting the carbonaceous porous structure with silicon in an inert atmosphere at a preselected siliconization temperature and a preselected siliconization pressure, wherein the preselected siliconization temperature exceeds the melting point of silicon.

16. The process of claim 15, wherein the step of contacting the carbonaceous porous structure with silicon includes utilizing silicon selected from the group consisting of a gas and a liquid.

17. The process of claim 15, wherein the preselected siliconization pressure is selected from the group consisting of atmospheric pressure, high pressure, vacuum, or partial vacuum.

18. The process of claim 1, further comprising the step of heating the filled silicon carbide preform at a preselected polymerization temperature to polymerize the carbon precursor within the filled silicon carbide preform such that the filled silicon carbide preform is a polymerized filled silicon carbide preform.

19. The process as described in claim 1, wherein the step of supplying a porous silicon carbide preform includes the steps of:
 a) supplying a graphite block having an open porosity.
 b) machining the graphite block into a near-net shape graphite article; and
 c) contacting the near-net shape graphite article with silicon monoxide at a first preselected temperature to form a porous silicon carbide preform.

20. The process as described in claim 1, wherein the known open porosity of the silicon carbide preform is in the range of about 10% to about 60% by volume.

* * * * *

UNITED STATES PATENT AND TRADEMARK OFFICE
CERTIFICATE OF CORRECTION

| | | |
|---|---|---|
| PATENT NO. | : 7,799,375 B2 | Page 1 of 1 |
| APPLICATION NO. | : 11/170199 | |
| DATED | : September 21, 2010 | |
| INVENTOR(S) | : Rashed et al. | |

It is certified that error appears in the above-identified patent and that said Letters Patent is hereby corrected as shown below:

<u>Col. 5, line 44</u>:

"...a porous silicon carbide perform having an..."

should read

-- ...a porous silicon carbide preform having an... --

Signed and Sealed this
Thirtieth Day of October, 2012

David J. Kappos
*Director of the United States Patent and Trademark Office*